United States Patent [19]

Joncour et al.

[11] Patent Number: 4,625,418
[45] Date of Patent: Dec. 2, 1986

[54] APPARATUS FOR DETERMINING THE DIAMETER OF A LENS TO FIT AN EYEGLASS FRAME

[75] Inventors: Christian Joncour, Saint-Maurice; Annick Leducq, Paris, both of France

[73] Assignee: Essilor International Cie Generale d'Optique, Creteil, France

[21] Appl. No.: 834,599

[22] Filed: Feb. 28, 1986

[30] Foreign Application Priority Data

Mar. 8, 1985 [FR] France .................. 85 03423

[51] Int. Cl.⁴ ............... G01B 5/00; A61B 3/10
[52] U.S. Cl. ........................... 33/200; 33/507
[58] Field of Search .................. 33/200, 507

[56] References Cited

U.S. PATENT DOCUMENTS

| | | | |
|---|---|---|---|
| 3,145,417 | 8/1964 | Shatzel | 33/507 |
| 3,313,031 | 4/1967 | Lowe | 33/507 |
| 3,740,857 | 6/1973 | Nerad | 33/507 |
| 4,196,978 | 4/1980 | Johnson | 33/200 |
| 4,299,032 | 11/1981 | Young | 33/507 |
| 4,309,826 | 1/1982 | Negroni | 33/200 |

FOREIGN PATENT DOCUMENTS

| | | |
|---|---|---|
| 0021998 | 1/1981 | European Pat. Off. . |
| 232293 | 3/1964 | Austria .................. 33/200 |
| 2037340 | 12/1970 | France . |
| 2362418 | 3/1978 | France . |
| 1160210 | 12/1963 | Fed. Rep. of Germany . |

Primary Examiner—Richard R. Stearns
Attorney, Agent, or Firm—Charles E. Brown; Charles A. Brown

[57] ABSTRACT

Apparatus for determining the diameter of an unprocessed ophthalmic lens to fit a particular eyeglass frame comprises a base and a guide on the base adapted to receive a card carrying diagrams of available lenses. A support on the base is adapted to receive the eyeglass frame to be fitted with lenses. The card guide is fixed relative to the base and comprises an elongate slot adapted to allow the card to slide within it. The frame support is mobile relative to the card guide in the direction at right angles to the slot.

15 Claims, 6 Drawing Figures

U.S. Patent  Dec. 2, 1986  Sheet 1 of 2  4,625,418
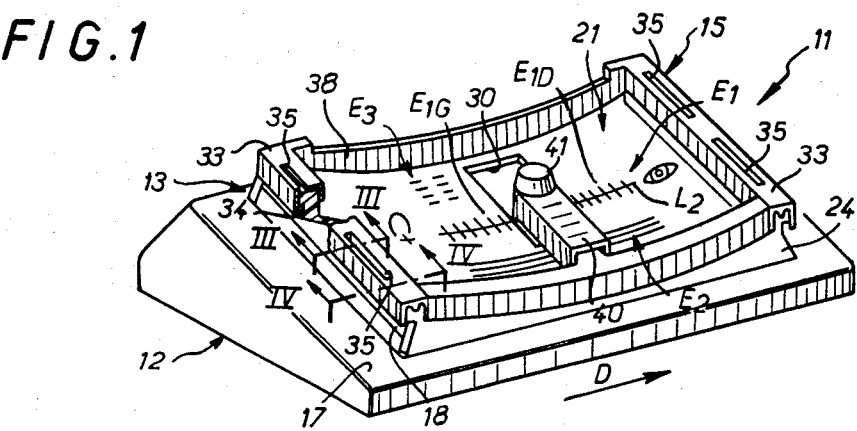
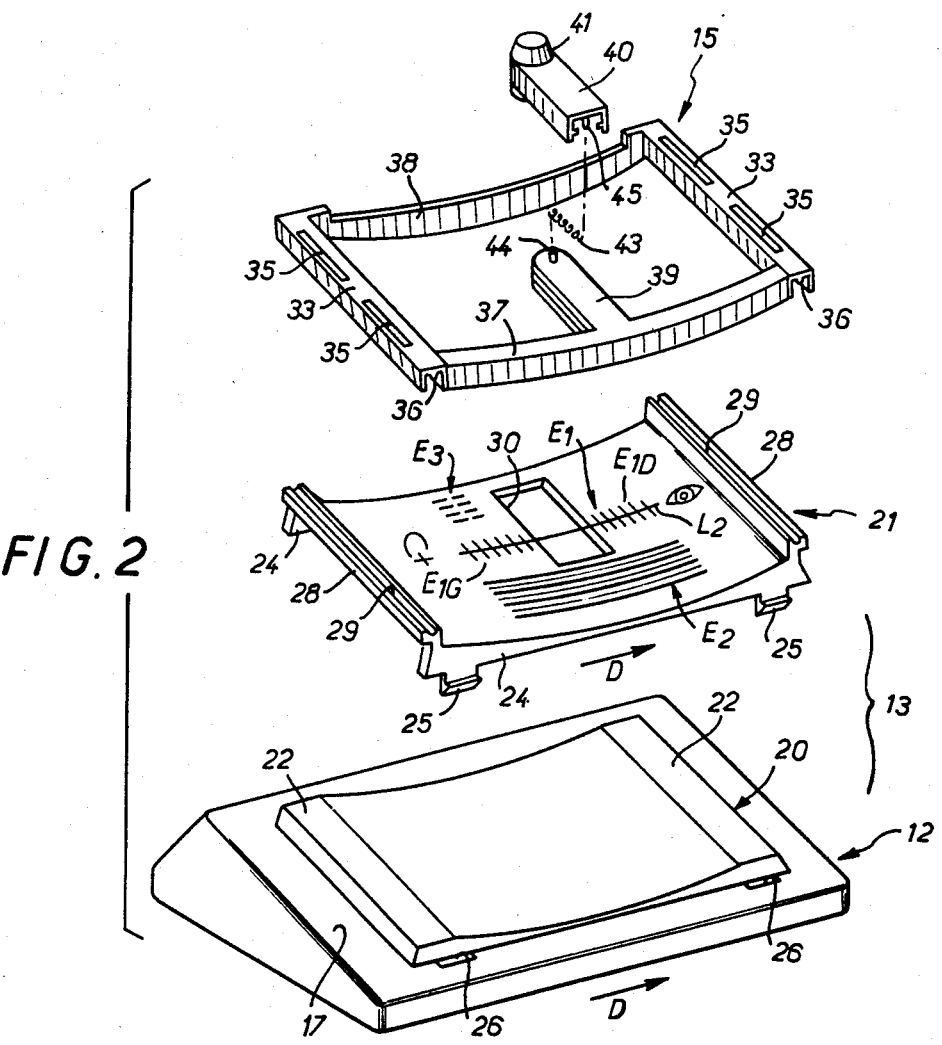

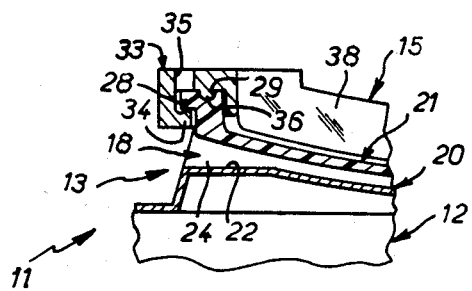
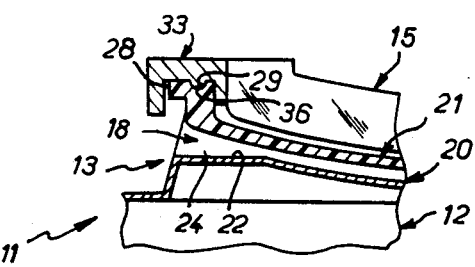
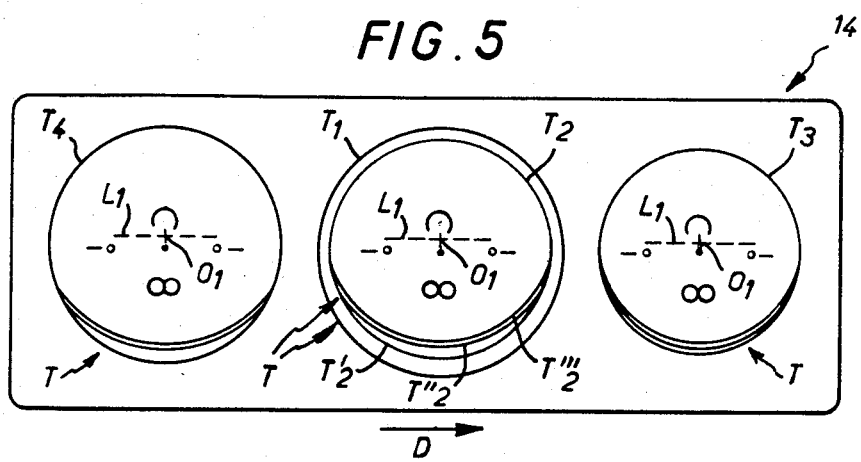
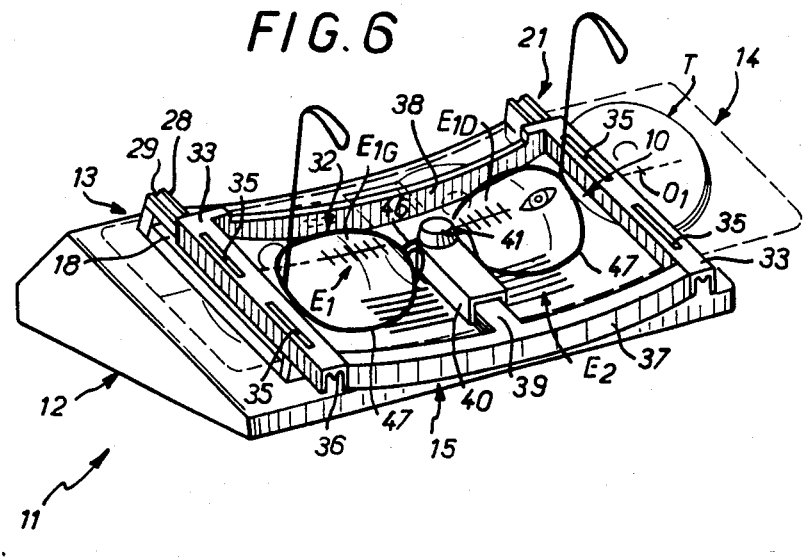

APPARATUS FOR DETERMINING THE DIAMETER OF A LENS TO FIT AN EYEGLASS FRAME

BACKGROUND OF THE INVENTION

1. Field of the Invention

The present invention is generally concerned with fitting ophthalmic lenses into the rings or surrounds that an eyeglass frame comprises for this purpose and it is more particularly but not exclusively directed to the case of corrective ophthalmic lenses.

2. Description of the Prior Art

As is known, unprocessed ophthalmic lenses as supplied to optometrists by the manufacturers have a circular contour at the periphery and, for obvious economic reasons, for a given type of ophthalmic lens optometrists are offered a plurality of unprocessed ophthalmic lenses of different peripheral diameters, the cost of unprocessed ophthalmic lenses being proportional to the diameter.

Thus for each eyeglass frame to be fitted with lenses the optometrist has to determine which of the available unprocessed ophthalmic lenses is the most economical to use, given the particular shape of the rings or surrounds of the eyeglass frame; in other words, he has to determine the lens within the contour of which the contour of the ring or surround will fit most closely.

As it happens, the problem is that more often than not the optometrist does not actually have the corresponding unprocessed ophthalmic lenses available to him, but only cards carrying diagrams of the ophthalmic lenses, and that in the case of corrective ophthalmic lenses he must take into account, conjointly, the physiological characteristics of the patient concerned and the optical characteristics of the corrective ophthalmic lenses.

In practice, the principal factor that the optometrist has to take into account is the horizontal distance between the pupils of the patient concerned, more precisely half the patient's interpupillary distance, for proper alignment of the optical center of the corresponding ophthalmic lens relative to the normal axis of vision of each eye of the patient.

In the case of progressive ophthalmic lenses, that is to say ophthalmic lenses of which the lower part, used for close vision, features progressively varying optical power along one meridian at least, unlike the upper part which is reserved for far vision and is usually of constant refractive power, the optometrist also has to take into account the vertical distance between the horizontal line passing through the pupil of the patient concerned for far vision and the bottom of the ring or surround of the eyeglass frame to be fitted with lenses.

Various instruments and apparatus have already been proposed to facilitate the task of the optometrist in determining the diameter of the unprocessed ophthalmic lenses to fit a particular eyeglass frame.

In one relatively simple formula, as described in the French patent filed Feb. 2, 1970 under application No. 70 03453 and published under number 2.307.340, this is a simple rule which, carrying diagrams of the available unprocessed ophthalmic lenses, may be equipped with a cursor movable along its length on which the eyeglass frame to be fitted with lenses may be placed.

As no support specifically for holding the eyeglass frame is provided, the operation to be undertaken is relatively clumsy and imprecise, and there may result some uncertainty as to the determined diameter.

Also, it is not possible with an instrument like this to take into account the aforementioned vertical distance.

In a more sophisticated formula, as described for example in the European patent application filed June 19, 1980 under the number 80400903.3 and published under the number 0 021 998, the apparatus proposed for determining the diameter of an unprocessed ophthalmic lens to fit a particular eyeglass frame comprises, on a base, a guide on said base adapted to receive a card carrying diagrams of available unprocessed ophthalmic lenses and a support on said base adapted to receive the eyeglass frame to be fitted with lenses.

In this way, and advantageously, the frame may be more firmly held.

In practice, however, this apparatus is relatively complex, expensive and bulky, in particular because the guide adapted to receive a card is mobile relative to the base whereas the support adapted to receive the eyeglass frame to be fitted with lenses is fixed relative to the base and, as these components are spaced from each other, to achieve virtual superposition of the corresponding images it is necessary to employ an optical system with light source and mirror.

Furthermore, using an apparatus like this is also relatively complicated; for example, two separate operations are necessary just to allow for the interpupillary distance, or rather half the interpupillary distance, of the patient concerned.

An object of the present invention is an apparatus for determining the diameter of an unprocessed ophthalmic lens to fit a particular eyeglass frame advantageously free of these disadvantages.

SUMMARY OF THE INVENTION

The present invention consists in apparatus for determining the diameter of an unprocessed ophthalmic lens to fit a particular eyeglass frame, comprising a base, a guide on said base adapted to receive a card carrying diagrams of available unprocessed ophthalmic lenses, and a support on said base adapted to receive the eyeglass frame to be fitted with lenses, wherein said card guide is fixed relative to said base and comprises an elongate slot adapted to allow said card to slide within it and said frame support is mobile relative to said card guide in the direction at right angles to said slot.

In practice, the frame support is superposed on the card guide and the card guide comprises a baseplate and a transparent table together defining the aforementioned slot, the table having on the back the necessary scales and a reference line that registers with a reference line on the diagrams on the associated card.

The resulting assembly is advantageously compact and economic, without any form of optical system, and particularly easy and precise to manipulate: once the eyeglass frame to be fitted with lenses is in position on the frame support all that is needed to allow for the aforementioned vertical distance is to move the frame support relative to the card guide and all that is necessary to allow for the interpupillary distance, or rather half the interpupillary distance, of the patient concerned is then to move the card corresponding to the suitable unprocessed ophthalmic lenses within the card guide.

It goes without saying that the apparatus in accordance with the invention thus makes it possible to determine, in the store, the diameter of the unprocessed ophthalmic lenses to be fitted to a particular eyeglass frame;

as a further advantage, it enables the corresponding assembly to be verified or checked in the workshop.

The characteristics and advantages of the invention will emerge from the following description given by way of example with reference to the accompanying diagrammatic drawings.

BRIEF DESCRIPTION OF THE DRAWINGS

FIG. 1 is a locally cut away view in perspective of the apparatus in accordance with the invention.

FIG. 2 is an exploded perspective view of the various component parts of the apparatus, to the same scale as FIG. 1.

FIGS. 3 and 4 are partial views of the apparatus to a larger scale and in longitudinal crosssection on the respective lines III—III and IV—IV in FIG. 1.

FIG. 5 is a plan view of a card adapted to be used in an apparatus of this kind.

FIG. 6 is a perspective view analogous to that of FIG. 1 showing the use of the apparatus in accordance with the invention.

DESCRIPTION OF THE PREFERRED EMBODIMENT

As shown in these figures, and in connection with determining the diameter of an unprocessed ophthalmic lens to be fitted to a particular eyeglass frame 10 (FIG. 6), the apparatus 11 in accordance with the invention comprises, on a base 12, a guide 13 adapted to receive a card 14 carrying diagrams T of available unprocessed ophthalmic lenses, hereinafter referred to for convenience as the card guide, and a support 15 adapted to receive an eyeglass frame 10 to be fitted with lenses, called hereinafter for convenience the frame support.

As shown in FIG. 5, the card 14 employed, which is of generally rectangular contour elongate along a direction D, may comprise, for example, a plurality of diagrams T corresponding to unprocessed ophthalmic lenses with different peripheral diameters disposed side by side and/or concentrically, for example.

In the embodiment shown there are four diagrams T on the card 14, comprising two diagrams T1, T2 in its median area disposed concentrically and, one on each side, a diagram T3 and a diagram T4.

For some at least of the diagrams of progressive ophthalmic lenses, the contour of the lower part of the diagrams may depart from a simple circular contour.

This is the case, for example, for the diagram T2 in which there are in the lower part diagrams T''2, T''2, T'''2 corresponding to progressively increasing additional refractive powers.

This is also the case in the embodiment shown for the diagram T3 and for the diagram T4.

Overall, however, the diagram T3 corresponds, for example, to the unprocessed ophthalmic lens with the smallest peripheral diameter, the diagrams T2 and T4 correspond, for example, to unprocessed ophthalmic lenses of intermediate peripheral diameter, and the diagram T1 corresponds, for example, to the unprocessed ophthalmic lens with the largest peripheral diameter.

Be this as it may, for each of these diagrams T and ignoring markings which, not being of relevance here, will not be described in detail, there is a reference line L1 and a center 01; the reference lines L1 for all the diagrams T are aligned, in practice parallel to the direction D in which the card 14 concerned is elongate.

The card 14 may naturally comprise diagrams T showing available unprocessed ophthalmic lenses on both sides.

In the embodiment shown the base 12 of the apparatus 11 in accordance with the invention has its upper surface, which is that carrying the other component parts of the apparatus 11, generally inclined, like a desk.

In accordance with the invention the card guide 13 that the base 12 carries is fixed relative to the base and compriese an elongate slot 18 adapted to allow the card 14 to slide within it, in practice in the direction D in which the card is elongate, and the frame support 15 is mobile relative to said card guide 13 in the direction at right angles to the slot.

In the embodiment shown the card guide 13 comprises a baseplate 20 and a table 21 spaced from said baseplate 20 and forming with it the slot 18 adapted to have the card 14 slide in it.

Like the card 14, the slot 18 that the card guide 13 thus comprises is elongate in the direction D.

As shown, it is preferably open at both ends and, as will emerge hereinafter, it is generally curved about an axis at right angles to the direction D in which it is elongate, with the concave side facing outwards.

The baseplate 20 of the card guide 13 has a generally rectangular contour in plan view. In practice it projects from the upper surface 17 of the base 12, with which it is in one piece, the combination formed by the base 12 and the baseplate 20 being in one piece and obtained, for example, by forming or molding any synthetic or metal material.

At its ends, the baseplate 20 features two plane facets 22 disposed transversely, that is to say at right angles to the direction D of elongation; the facets 22 are coplanar and parallel to the upper surface 17 of the base 12; between said facets 22 and the baseplate 20 is generally curved about an axis generally orthogonal to said direction D of elongation, with its concave side facing outwards.

The associated table 21 also has a generally rectangular contour in plan view, reflecting that of the baseplate; it is in practice of a transparent material.

Like the central part of the baseplate 20, and reflecting the latter, it is generally curved about an axis at right angles to the direction D of elongation but, unlike the baseplate 20, it does not have any plane facets at its ends.

As a result, the slot 18 that the table 21 forms in conjunction with the baseplate 20 is outwardly flared at both ends, which facilitates inserting the card 14.

In the longitudinal direction, along its longer sides, the table 21 comprises flanges 24 through the intermediary of which it embraces the baseplate 20.

At their ends these flanges 24 are extended in the embodiment shown by lugs 25 by means of which the table 21 is attached to the base 12, which features for this purpose openings 26 at the level of the baseplate 20 adapted to receive the lugs 25.

In the embodiment shown the lugs 25, which are elastically deformable, are hook-shaped to provide for retention snap-fastener fashion.

As is readily understood, the flanges 24 that the table 21 of the card guide 13 thus features define between them the width of the slot 18 that the card guide 13 comprises, which is made substantially equal to that of the card 14 to be used, being slightly greater than this.

At its ends the table 21 comprises two transverse rails 28 projecting console fashion in opposite directions, for reasons to be explained hereinafter, each extending substantially perpendicular to the direction D of elongation of the assembly.

In the embodiment shown, each of these rails 28 has over its entire length in its upper surface a groove 29 the transverse cross-section of which is substantially semi-circular.

The table 21 of the card guide 13 of the apparatus 11 in accordance with the invention carries at least one scale E.

In practice it carries at least two separate scales E, a scale E1 parallel to the direction D of elongation of the corresponding slot 18 and a scale E2 perpendicular thereto.

In practice, the scale E1 is located substantially in the median area of the table 1 and is a double scale formed by two sections E1G, E1D aligned with each other and disposed generally symmetrically relative to the median transverse axis of the assembly, each of these scale sections E1G, E1D corresponding to respective lefthand and righthand rings or surrounds of the eyeglass frame 10 to be fitted with lenses.

The resulting scale E1 corresponds in practice to the interpupillary distance, more precisely to half the interpupillary distance, to be complied with; associated with it is a reference line L2 parallel to the direction D of elongation and with which is registered the reference line L1 of the card 14 used, these reference lines L1, L2 being intended to be superposed on each other when determining the diameter.

The markings of the scale E1 are substantially perpendicular to the direction D of elongation whereas those of the scale E2 are substantially parallel to this direction.

The scale E2 is disposed in the vicinity of one of the longitudinal edges of the table 21 and its markings, which are relatively long, extends to each side of the median transverse axis of the assembly.

Finally, in the embodiment shown the table 21 of the card guide 13 comprises a third scale E3 in one of the corners of the table 21 opposite the scale E2 and perpendicular to the direction D of elongation, its markings being substantially parallel to this direction D of elongation, like those of the scale E2.

In practice the various scales E1, E2, E3 that the table 21 of the card guide 13 comprises are millimeter scales and to minimize any possible parallax errors they are marked on the back of the table 21.

As shown, the table 21 may of course comprise other markings or symbols.

In the embodiment shown, and for reasons which will emerge hereinafter, the table 21 of the card guide 13 has a recess 30 in the median area of its surface.

As mentioned hereinabove, the frame support 15 is mobile relative to the card guide 13 in a direction at right angles to the direction D in which the slot 18 that the latter comprises is elongate.

In practice, and as shown, the frame support 15 is superposed on the card guide 13 and is in the form of a frame adapted to circumscribe in its entirety the eyeglass frame 11 to be fitted with lenses, more precisely the face 32 of the latter.

Like the card guide 13, the frame which thus forms the frame support 15 is generally rectangular, being elongate in the direction D in which the slot 18 of the latter is elongate.

By two opposite sides, which are the transverse sides 33 of smaller dimension, it is engaged with the card guide 13, more precisely with the rails 28 that the latter features for this purpose.

In practice these transverse sides 33 are generally crook-shaped and their free edges carry spaced inwardly directed tabs 34 adapted to be engaged under the corresponding rail 28 of the card guide 13.

A right-angle tab 34 can be seen in FIGS. 1 and 3.

For possible fabrication of the frame support 15 by molding, the median part of the transverse sides 33 thereof features, in line with the right-angle tabs 34, and in corresponding relationship thereto, openings 35 permitting punches necessary to form such right-angle tabs 34 to pass through.

Be this as it may, on its inside surface this median part of the transverse sides 33 of the frame support 15 features, in the embodiment shown, a projecting bead 36 extending over its entire length and of semi-circular transverse cross-section, designed to fit snugly in the groove 29 in the corresponding rails 28 of the card guide 13.

As an alternative to this, relative sliding of the frame support 15 and the card guide 13 may be procured by balls disposed in a stressed configuration between these two parts.

As shown, means are preferably provided for centering the eyeglass frame 11 to be fitted with lenses on the frame support 15.

In the embodiment shown these centering means are carried by a third side of the frame forming the frame support 15, namely its longitudinal side 37 disposed at the lower side of the base 11; they are adapted to urge the eyeglass frame 10 to be fitted with lenses in the direction towards the fourth side of this frame, that is its other longitudinal side 38.

In practice, they comprise an arm 39 perpendicular to the longitudinal side 37 extending from the median area of the latter and, mobile on this arm 39, being engaged with it by means of rails, for example, a head 40 with a projecting button 41 to make it easier to manipulate.

Elastic means provided between the arm 39 and the head 40 urge the latter towards the longitudinal side 38 of the frame support 15.

For example, and as is more clearly seen in FIG. 2, a tension spring 43 has one end attached to a pin 44 on the arm 39 and the other end attached to a pin 45 on the head 40.

To use the apparatus 11 in accordance with the invention it is necessary first to place the eyeglass frame 10 to be fitted with lenses into the frame that forms the eyeglass frame support 15 provided for it in the apparatus 11.

To do this all that is necessary is to move the head 40 carried by the arm 39 in the direction towards the longitudinal side 37 of the frame, to insert the bridge 46 of the eyeglass frame 10 between the head 40 and the opposite longitudinal side 38 of the frame, and then to release the head 40.

Spring loaded by the spring 42 provided for this purpose, the head 40 then presses on the upper edge of the rings or surrounds 47 so as to press the face 32 of the eyeglass frame 10 against the longitudinal side 38 of the frame that the frame support 15 forms.

This longitudinal side 38, which is that on the highest side of the base 12, thus serves as a reference base for the eyeglass frame 10.

As is easily understood, the recess 30 in the surface of the table 21 of the card guide 13 advantageously facilitates fitting the eyeglass frame 10 to be fitted with lenses into the frame support 15, the bridge 46 of the eyeglass frame 10 being accommodated, if necessary, in this recess 30.

The frame support 14 thus carrying the eyeglass frame 10 to be fitted with lenses is then moved on the rails 28 of the card guide 13 until the inside part of the lower edge of its rings or surrounds 47 is level with the marking on the scale E2 carried by the table 21 of the card guide 13 that corresponds to the aforementioned vertical distance to be complied with.

With a card 14 inserted into the slot 18 in the card guide 13, as schematically represented in chain-dotted line in FIG. 5, all that is necessary is to move the card 14 in the card guide 13 until the diagram T inside which the contour of the ring or surround 47 concerned can be best fitted in its entirety has its center 01 in line with the marking on the scale E1G or E1D corresponding to the interpupillary distance, or rather half the interpupillary distance, to be complied with.

This latter operation is naturally repeated for both rings or surrounds 47 of the eyeglass frame 10 to be equipped.

In both cases, it is easier to read the card 14 because of the curvature imposed on it by the card guide 13 into which it is inserted.

In practice, this curvature advantageously reflects that which is usually a feature of the face of eyeglass frames; it also makes it possible to minimize parallax errors.

The scale E3 may be used, where required, to determine the aforementioned vertical distance in the case of fitting unifocal ophthalmic lenses, showing the same dimension on the scales E2 and E3 at the level of the bezel of the rings or surrounds of the eyeglass frame 10 to be fitted with lenses.

Moreover, and as already indicated hereinabove, the apparatus 11 in accordance with the invention may also be used in the workshop to verify the fit of the ophthalmic lenses chosen within the contour of the rings or surrounds of the eyeglass frame to be fitted with lenses; all that is necessary to achieve this is to set the interpupillary distance (or half the interpupillary distance) and the aforementioned vertical distance measured.

Once the lenses have been fitted, it may also be used to check the fitting by comparing the actual dimensional characteristics of the fitting with those measured, after checking with a lensometer.

The present invention is naturally not limited to the embodiment described and shown, but encompasses any variant execution.

There is claimed:

1. Apparatus for determining the diameter of an unprocessed ophthalmic lens to fit a particular eyeglass frame, comprising a base, a guide on said base adapted to receive a card carrying diagrams of available unprocessed ophthalmic lenses, and a support on said base adapted to receive the eyeglass frame to be fitted with lenses, wherein said card guide is fixed relative to said base and comprises an elongate slote adapted to allow said card to slide within it and said frame support is mobile relative to said card guide in the direction at right angles to said slot.

2. Apparatus according to claim 1, wherein the card guide comprises a baseplate and a table spaced from said baseplate and forming with said baseplate said slot adapted to have the card slide within it.

3. Apparatus according to claim 2, wherein said baseplate of said card guide is in one piece with said base.

4. Apparatus according to claim 2, wherein said table of said card guide is attached to said base.

5. Apparatus according to claim 2, wherein said table of said card guide is transparent and carries at least one scale.

6. Apparatus according to claim 5, wherein said table of said card guide carries at least two separate scales one parallel to the direction in which the corresponding slot is elongate and the other perpendicular thereto.

7. Apparatus according to claim 5, wherein there is associated with said scale parallel to the direction in which said slot of said card guide is elongate a reference line parallel to said direction of elongation adapted to be registered with a reference line on the diagrams on said card.

8. Apparatus according to claim 5, wherein said scales on said table of said guide card are on the back thereof.

9. Apparatus according to claim 2, characterized in that said table of said card guide has a recess in the median area of its surface.

10. Apparatus according to claim 1, wherein said slot of said card guide is generally curved about an axis orthogonal to the direction in which it is elongate with its concave side facing outwards.

11. Apparatus according to claim 1, wherein said slot of said card guide is open at both ends.

12. Apparatus according to claim 1, wherein said slot of said card guide is outwardly flared at one end at least.

13. Apparatus according to claim 1, wherein said frame support is superposed on said card guide.

14. Apparatus according to claim 13, wherein said card guide comprises parallel rails with which said frame support is engaged.

15. Apparatus according to claim 13, wherein said frame support has the general shape of a frame adapted to circumscribe the eyeglass frame to be fitted with lenses and is interlocked with said card guide through two opposite sides of this frame, means are provided for centering said eyeglass frame on a third side of said frame and said centering means are adapted to urge said eyeglass frame towards the fourth side of said frame.

* * * * *